United States Patent
Ueno (10) Patent No.: US 7,961,302 B2
(45) Date of Patent: Jun. 14, 2011

(54) PHYSICAL QUANTITY SENSOR AND PHYSICAL QUANTITY MEASURING METHOD

(75) Inventor: Tatsuya Ueno, Tokyo (JP)

(73) Assignee: Yamatake Corporation, Tokyo (JP)

( * ) Notice: Subject to any disclaimer, the term of this patent is extended or adjusted under 35 U.S.C. 154(b) by 181 days.

(21) Appl. No.: 12/360,201

(22) Filed: Jan. 27, 2009

(65) Prior Publication Data

US 2009/0195771 A1 Aug. 6, 2009

(30) Foreign Application Priority Data

Jan. 31, 2008 (JP) .................. 2008-020712

(51) Int. Cl.
*G01P 3/36* (2006.01)
(52) U.S. Cl. ..................... 356/28.5; 356/28
(58) Field of Classification Search ........ 356/3.01–3.15, 356/4.01–4.1, 5.01–5.15, 6–22, 28, 28.5
See application file for complete search history.

(56) References Cited

U.S. PATENT DOCUMENTS

2003/0016365 A1* 1/2003 Liess et al. .............. 356/498
2009/0154521 A1* 6/2009 Wang et al. ............... 374/53

FOREIGN PATENT DOCUMENTS

JP 2006-313080 11/2006

OTHER PUBLICATIONS

Ueda, et al., "Distance Measurement Using the Self-Coupling Effect of a Semiconductor Laser", 1994 Transactions of the Institute of Electrical Engineers of Japan, Tokai Branch 1994.
Yamada et al., "Study of Compact Distance Meter by Self-Coupled Effect of Laser Diode" Aichi Technical University Researcher Report, No. 31 B, pp. 35-42, 1996.
Giuliani et al., "Laser Diode Self-Mixing Technique for Sensing Applications" Journal of Optics A: Pure and Applied Optics, pp. 283-294, 2002.

* cited by examiner

*Primary Examiner* — Thomas H Tarcza
*Assistant Examiner* — Luke D Ratcliffe
(74) *Attorney, Agent, or Firm* — McDermott Will & Emery LLP (57) ABSTRACT

A physical quantity sensor has a semiconductor laser, a laser driver for providing, to the semiconductor laser, a driving electric current that is a waveform wherein the maximum portions and minimum portions of a triangle wave have been rounded; detecting means (a photodiode and a current-voltage converting amplifier) for detecting an electric signal that includes an interference waveform that is produced by the self-coupling effect between a laser beam that is emitted from the semiconductor laser and a return beam from a measurement object; and measuring means (a filter circuit, a counting device, and a calculating device) for calculating a physical quantity for the measurement object from interference waveform information.

10 Claims, 8 Drawing Sheets

PHYSICAL QUANTITY SENSOR AND PHYSICAL QUANTITY MEASURING METHOD

CROSS-REFERENCE TO PRIOR RELATED APPLICATIONS

The present application claims priority under 35 U.S.C. §119 to Japanese Patent Application No. 2008-020712 filed Jan. 31, 2008, the contents of which are incorporated herein by reference in their entirety.

FIELD OF TECHNOLOGY

The present invention relates to a physical quantity sensor and a physical quantity measuring method for measuring a physical quantity, such as distance from an object or the velocity of the object, from information about interference that is produced by the self-coupling effect between a laser beam that is emitted from a semiconductor laser and a return beam from the object.

BACKGROUND OF THE INVENTION

Figure 10:
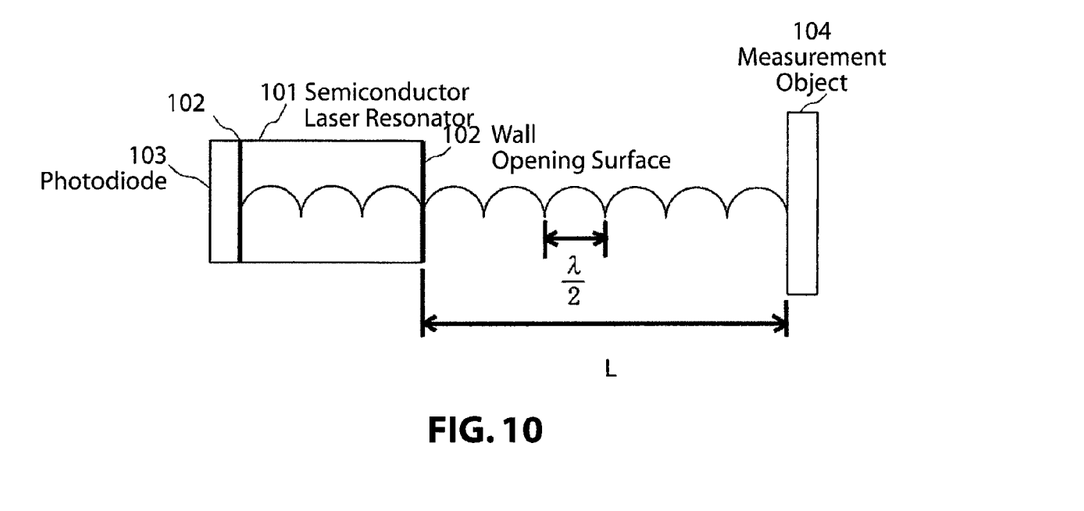
FIG. 10 is a diagram illustrating a compound resonator model of a semiconductor laser in a conventional laser measuring device.

Conventionally there have been proposals for laser measurement devices that use interference, on the inside of a semiconductor laser, between the laser output beam and a return beam from a measurement object (known as the "self-coupling effect") as a way to measure a distance using interference in light from a laser. (See, for example, UEDA Tadashi, YAMADA Jun, SHITO Susumu: "Distance Measurement Using the Self-Coupling Effect of a Semiconductor Laser," 1994 Transactions of the Institute of Electrical Engineers of Japan, Tokai Branch, 1994; YAMADA Jun, SHITO Susumu, TSUDA Norio, UEDA Tadashi: "Research Regarding Small Distance Meter Using the Self-Coupling Effect of a Semiconductor Laser," Aichi Technical University Researcher Report, No. 31 B, Pages 35 through 42, 1996; and, Guido Giuliani, Michelle Norgia, Silvano Donati, and Thierry Bosch: "Laser Diode Self-Mixing Technique for Sensing Applications," Journal of Optics A: Pure and Applied Optics, Pages 283 to 294, 2002.) A compound resonator model for an FP-type (Fabry-Perot-type) semiconductor laser is illustrated in FIG. 10. In FIG. 10, 101 is a semiconductor laser, 102 is a said opening surface of a semiconductor crystal, 103 is a photodiode, and 104 is a measurement object.

When the emission wavelength of the laser is $\lambda$, and the distance from the side opening surface 102 nearest to the measurement object 104 to the measurement object 104 is L, then when the resonance conditions set forth below are fulfilled, the return beam from the measurement object 104 and the laser beam within a resonator 101 reinforce each other increasing slightly the laser power:

$$L = q\lambda/2 \quad 1$$

In Equation (1), q is an integer. This phenomenon produces an amplifying effect, which is fully observable, through increasing the apparent reflectance rate within the resonator 101 of the semiconductor laser, even if the scattered light from the measurement object 104 is extremely weak.

Figure 11:
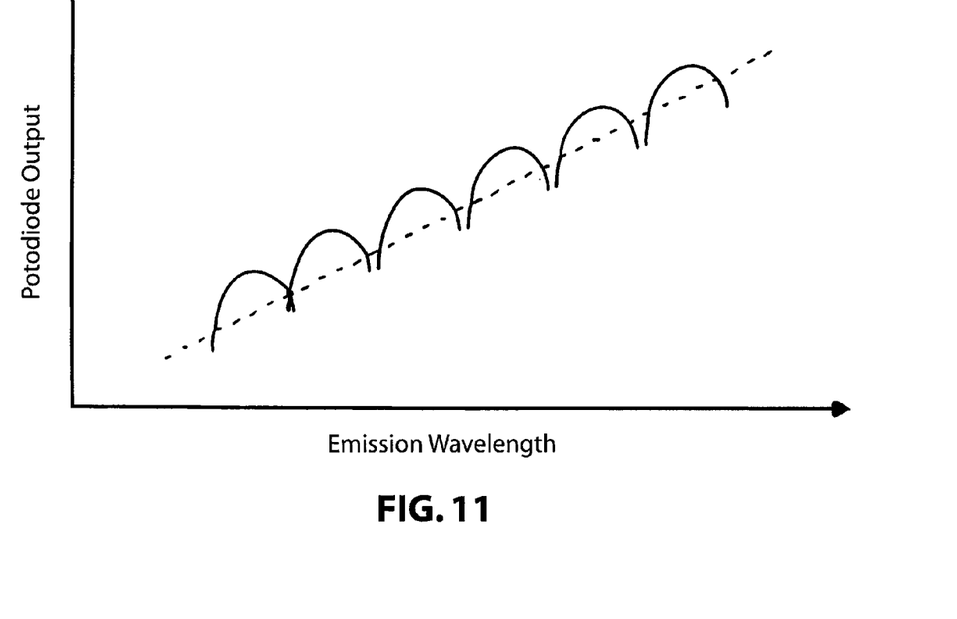
FIG. 11 is a diagram illustrating the relationship between the emission wavelength of a semiconductor laser and the output waveform of an internally provided photodiode.

Because a semiconductor laser emits a laser beam of a frequency that varies according to the magnitude of the injected electric current, there is no need for an external modulator when modulating the emission frequency, enabling direct modulation through the injected electric current. FIG. 11 is a diagram illustrating the relationship between the emitted wavelength and the output waveform of a photodiode 103 when varying the emission wavelength of the semiconductor laser with a constant ratio. When the $L=q\lambda/2$ given in Equation (1) is fulfilled, then the phase difference between the return beam and the laser beam within the resonator 101 goes to 0° (that is, the phase is the same), causing maximum mutual reinforcement between the return beam and the laser beam within the resonator 101, and when $L=q\lambda/2+\lambda/4$, the phase difference will be 180° (the phase will be inverted), so the return beam and the laser beam within the resonator 101 weaken each other. Because of this, when the emission wavelength of the semiconductor laser is changed, the laser power is seen to repetitively alternate between places wherein it becomes stronger and places wherein it becomes weaker, and if the laser power at this time is detected by a photodiode 103 provided in the resonator 101, a waveform is obtained that has a stair-step shape at regular intervals, as illustrated in FIG. 11. This type of waveform is typically called interference fringes.

In this stair-step waveform, each of the individual interference fringes is known as a "mode hop pulse" (hereinafter termed an "MHP"). An MHP is a different phenomenon from the mode hopping phenomenon. If, for example, the number of MHPs is 10 when the distance to the measurement object 104 is L1, then the number of MHPs would be 5 at half the distance L2. That is, if the emission wavelength of the semiconductor laser were varied over a given time period, the number of MHPs would vary proportionately with the measurement distance. Consequently, measuring the MHP frequency by detecting MHPs using the photodiode 103 makes it easy to measure the distance.

However, in a conventional interferometric measuring device that includes self-coupling, there is a problem in that it is not possible to measure the distance of a measurement object that has a velocity, despite being able to measure the distance to a stationary measurement object.

Figure 12:
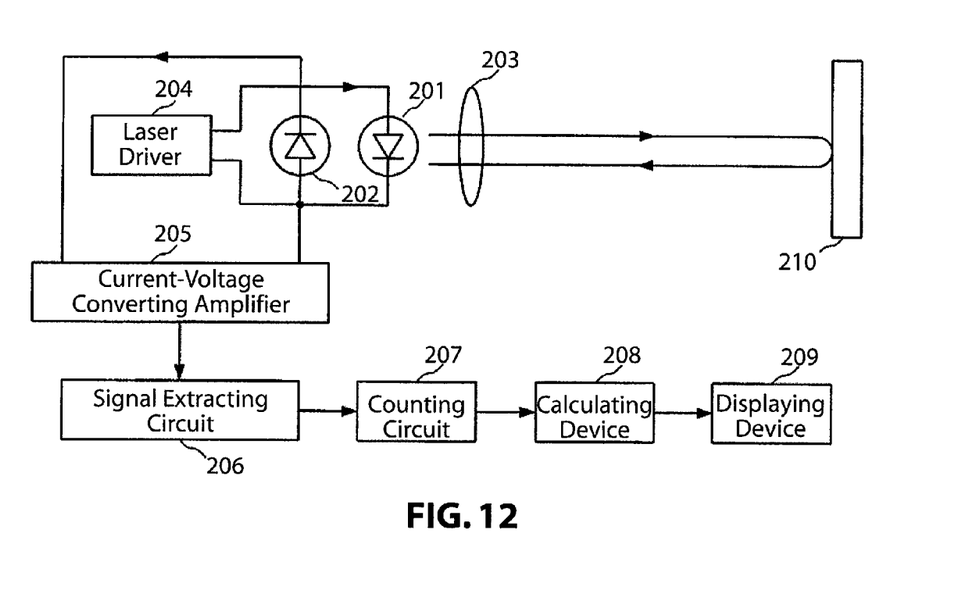
FIG. 12 is a block diagram illustrating the structure of a conventional distance/velocity meter.

Given this, the present inventors have proposed a distance/velocity meter capable of not only measuring the distance to a stationary measurement object, but also measuring the velocity of the measurement object. (See Japanese Unexamined Patent Application Publication No. 2006-313080, hereinafter "JP '080".) FIG. 12 illustrates the structure of this distance/velocity meter. The distance/velocity meter of FIG. 12 includes an a semiconductor laser 201 for emitting a laser beam towards the measurement object; a photodiode 202 for converting the optical power of the semiconductor laser 201 into an electric signal; a lens 203 for not only focusing the beam from the semiconductor laser 201 and directing the beam towards the measurement object 210, but also for focusing the return beam from the measurement object 210 and injecting it into the semiconductor laser 201; a laser driver 204 for repetitively alternating between a first emitting period wherein the emission wavelength of the semiconductor laser 201 is continuously increased, and a second emitting period wherein the emission wavelength is continuously decreased; a current-voltage converting amplifier 205 for converting the output current of the photodiode 202 into a voltage and then amplifying; a signal extracting circuit 206 for performing double differentiation of the output voltage of the current-voltage converting amplifier 205; a counting circuit 207 for counting the number of MHPs included in the output voltage of the signal extracting circuit 206; a calculating device 208 for calculating the distance to the measurement object 210 and the velocity of the measurement object 210; and a displaying device 209 for displaying the calculation results of the calculating device 208.

Figure 13:
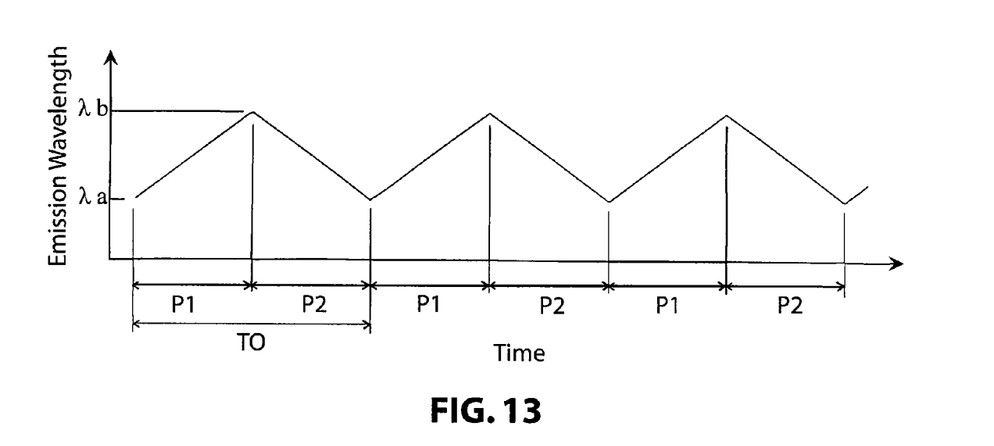
FIG. 13 is a diagram illustrating one example of the changes over time in the emission wavelength of a semiconductor laser in the distance/velocity meter of FIG. 12.

The laser driver 204 provides, to the semiconductor laser 201, a triangle wave driving electric current, as an injection current, that is repetitively increased and decreased at a constant rate of change in respect to time. As a result, the semiconductor laser 201 is driven so as to repeatedly alternate between a first emission period wherein the emission wavelength increases continuously at a constant rate of change, and a second emission period wherein the emission wavelength decreases continuously at a constant rate of change. FIG. 13 is a diagram illustrating the change in the emission wavelength of the semiconductor laser 201 over time. In FIG. 13, P1 is the first emission period, P2 is the second emitting period, λa is the minimum value for the emission wavelength in each of the periods, λb is the maximum value for the emission wavelength in each of the periods, and P0 is the period of the triangle wave.

The laser beam that is emitted from the semiconductor laser 201 is focused by the lens 203 and is incident on the measurement object 210. The beam that is reflected from the measurement object 210 is focused by the lens 203 and is injected into the semiconductor laser 201. The photodiode 202 converts the optical power of the semiconductor laser 201 into an electric current. The current-voltage converting amplifier 205 converts the output current of the photodiode 202 into a voltage and amplifies the results. The signal extracting circuit 206 performs double differentiation on the output voltage of the current-voltage converting amplifier 205. The counting circuit 207 counts the number of MHPs included in the output voltage of the signal extracting circuit 206 over the first emission period P1 and the second emission period P2. The calculating device 208 calculates the distance to the measurement object 210 and the velocity of the measurement object 210 based on the minimum emission wavelength λa and the maximum emission wavelength λb of the semiconductor laser 1, the number of MHPs in the first emission period P1, and the number of MHPs in the second emission period P2.

The self coupling-type distance meter illustrated in FIG. 10 is capable of measuring the distance to a measurement object, and the distance/velocity meter illustrated in FIG. 12 is capable of simultaneously measuring the distance to a measurement object and the velocity of the measurement object.

Figure 14A:
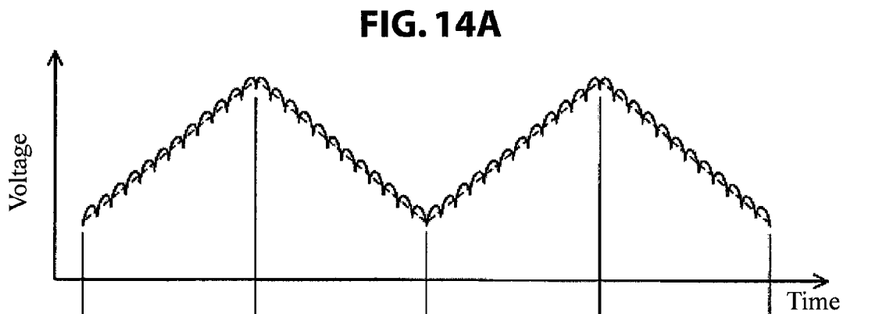
FIGS. 14(A) and (B) are diagrams illustrating the problem areas in a conventional self-coupling type laser measurement device.
Figure 14B:
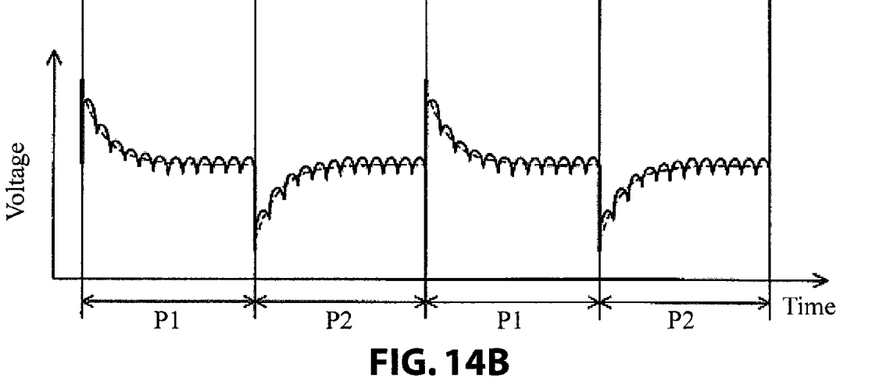

However, in a conventional self-coupling-type laser measurement instrument illustrated in FIG. 10 and FIG. 12, the emission wavelength of the semiconductor laser is varied in the form of a triangle wave, so they have the problem of not being able to completely exclude the effect of transient responses at the apexes of the triangle wave. FIG. 14(A) and FIG. 14(B) are diagrams for explaining the problem area with the conventional self-coupled-type laser measurement device, where FIG. 14(A) is a diagram illustrating schematically the output voltage waveform of the current-voltage converting amplifier 205, and FIG. 14(B) is a diagram illustrating schematically the output voltage waveform of the signal extracting circuit 206.

The signal extracting circuit 206, which is structured from a differentiating circuit or a high-pass filter, excludes the emission waveform (carrier wave) of the semiconductor laser 1 of FIG. 13 from the waveform (modulated wave) of FIG. 14(A) that corresponds to the output of the photodiode 202, to extract the MHP waveform of FIG. 14(B). At this time, a spike-shaped transient waveform, such as in FIG. 14(B), appears with the timing of the apexes of the triangle wave, in the output of the signal extracting circuit 206. Because the counting circuit 207 cannot count the MHPs in the transient waveform portion, error is produced in the count. The result is that there will be error in the distance and the velocity calculated by the calculating device 208.

The present invention was created in order to solve the problem area set forth above, and the object thereof is to provide a physical quantity sensor and physical quantity measuring method capable of reducing the effect of the transience at the triangle wave apex points that is included in the output signal of the photoreceiver device.

Summary of the Invention The physical quantity sensor as set forth in the present invention has a semiconductor laser for emitting a laser beam at a measurement object; a laser driver for supplying to the semiconductor laser a driving electric current with a waveform wherein maximum portions and minimum portions of a triangle wave are rounded; detecting means for detecting an electric signal that includes an interference waveform that is produced by the self-coupling effect of the laser beam that is emitted from the semiconductor laser and the return beam from the measurement object; and measuring means for measuring a physical quantity of the measurement object from interference waveform information that is included in an output signal from the detecting means.

Additionally, in an example of the physical quantity sensor in the present invention, the waveform of the driving electric current is a waveform wherein maximum portions and minimum portions of the triangle wave are replaced by maximum portions and minimum portions of a sine wave.

Additionally, in an example of the physical quantity sensor in the present invention, the waveform of the driving electric current is a waveform that combines a sine wave of a fundamental frequency and a sine wave of a higher-order frequency.

Additionally, in an example of the physical quantity sensor in the present invention, the physical quantity of the measurement object is a distance from the measurement object and/or a velocity of the measurement object.

Furthermore, in an example of the physical quantity sensor according to the present invention, the measuring means includes counting means for counting the number of interference waveforms included in an output signal of the detecting means over a counting period on the rising side of the semiconductor laser emission wavelength and over a counting period on the falling side of the emission wavelength; and calculating means for calculating a distance from the measurement object and/or a velocity of the measurement object from the counting results of the counting means and the minimum emission wavelength and the maximum emission wavelength of the semiconductor laser.

Furthermore, the physical quantity measuring method according to the present invention includes an emitting process wherein a driving electric current that has a waveform wherein maximum portions and minimum portions of a triangle wave are rounded is supplied to a semiconductor laser to cause the semiconductor laser to operate; a detecting process for detecting an electric signal that includes an interference waveform that is produced by the self-coupling effect between a laser beam that is emitted from the semiconductor laser and a return beam from the measurement object; and a measuring process for measuring the physical quantity of the measurement object from interference waveform information that is included in the output signal obtained in the detecting process.

Given the present invention, a driving electric current of a waveform wherein maximum portions and minimum portions of a triangle wave are rounded is supplied to a semiconductor laser, so that when an information for the interference waveform that is included in the output signal of the detecting means is obtained, the transient waveform that is produced with the timing with which the rising portion and the falling portion of the output signal of the detecting means switches can be reduced relative to the conventional technology, making it possible to reduce the interference waveform detection error. The result is that, in the present invention, it is possible to improve the measurement accuracy of the physical quantity.

DETAILED DESCRIPTION OF THE INVENTION

Figure 1:
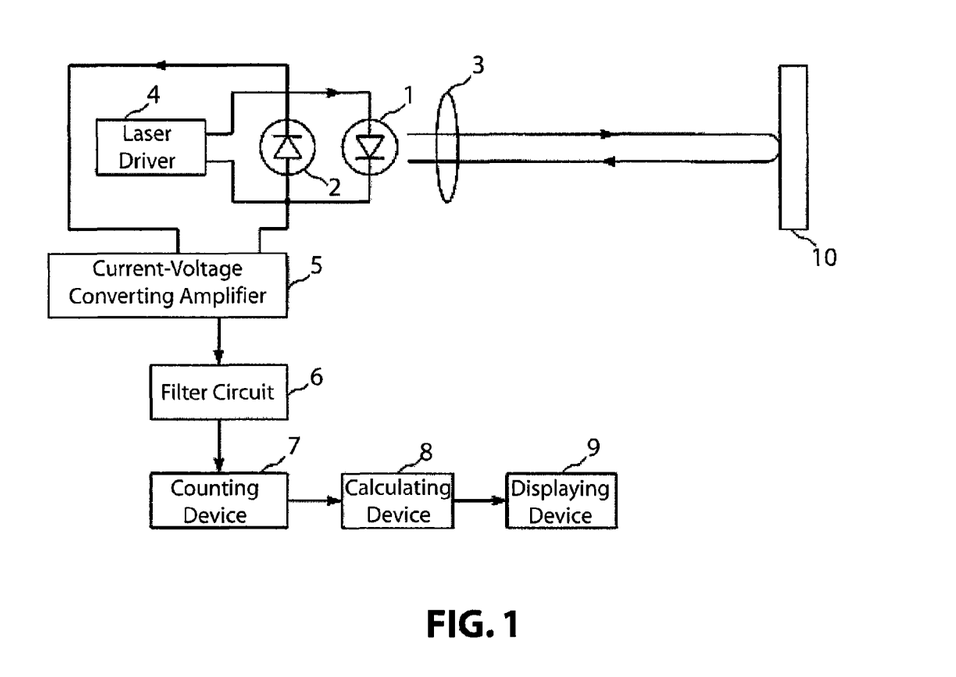
FIG. 1 is a block diagram illustrating the structure of a distance/velocity meter of an embodiment according to the present invention.

A form of embodiment of the present invention will be explained below in reference to the figures. FIG. 1 is a block diagram illustrating the structure of a distance/velocity meter according to the present invention. The distance/velocity meter in FIG. 1 includes a semiconductor laser 1 for emitting a laser beam towards a measurement object 10; a photodiode 2 that is a photoreceiver for converting the optical power of the semiconductor laser 1 into an electric signal; a lens 3 for both focusing the beam from the semiconductor laser 1 and directing the beam to the measurement object 10, and for focusing the return beam from the measurement object 10 and injecting the beam into the semiconductor laser 1; a laser driver 4 for driving the semiconductor laser 1; a current-voltage converting amplifier 5 for converting, into a voltage, the output current from the photodiode 2, and then amplifying; a filter circuit 6 for excluding the carrier wave from the output voltage from the current-voltage converting amplifier 5; a counting device 7 for counting the number of MHPs included in the output voltage of the filter circuit 6; a calculating device 8 for calculating the distance to the measurement object 10 and calculating the velocity of the measurement object 10 from the number of MHPs; and a displaying device 9 for displaying the results of the calculation of the calculating device 8.

The filter circuit 6, the counting device 7, and the calculating device 8 are part of the measuring means. Furthermore, the filter circuit 6 and the counting device 7 are included in the counting means.

For ease in the explanation below, it will be assumed that the semiconductor laser 1 is of a type that does not have the mode-hopping phenomenon (a VCSEL or DFB laser).

Figure 2:
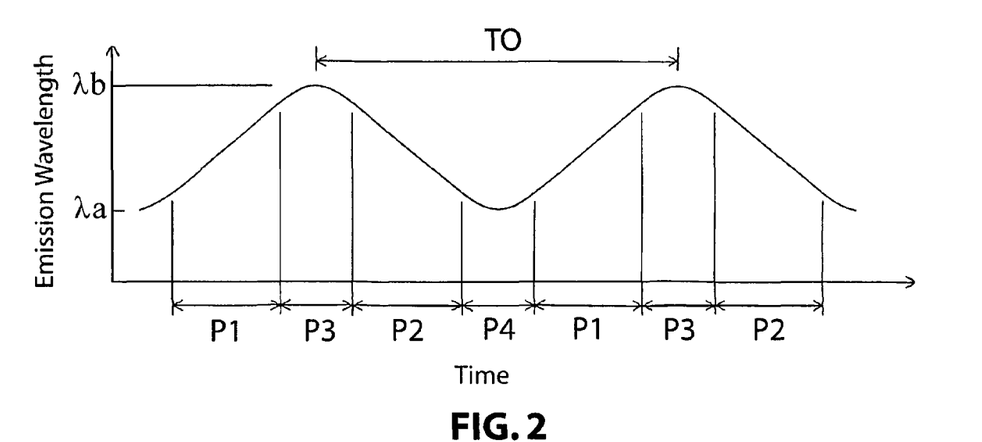
FIG. 2 is a diagram illustrating one example of the changes over time in the emission wavelength of the semiconductor laser in an embodiment according to the present invention.

FIG. 2 is a diagram illustrating changes over time in the emission wavelength of the semiconductor laser 1. The laser driver 4 provides, to the semiconductor laser 1, a driving electric current of a waveform wherein the maximum portions and minimum portions of a triangle wave have been replaced by, respectively, the maximum portions and minimum portions of a sine wave. Doing so causes the semiconductor laser 1 to be driven repetitively over a first emission period P1 wherein the emission wavelength is increased with a constant rate of change, a second emission period P2 wherein the emission wavelength is decreased continuously with a constant rate of change, a third emission period P3, between the first emission period P1 and the second emission period P2, wherein the emission wavelength changes in the form of the maximum portion of a sine wave, and a fourth emission period P4, between the second emission period P2 and the first emission period P1, wherein the emission wavelength changes in the form of a minimum portion of a sine wave. In the present form of embodiment, the maximum value λb of the emission wavelength and the minimum value λa of the emission value always remain constant, and the difference λb−λa also always remains constant. T0 in FIG. 2 is the period of the emission waveform.

FIG. 3 is a diagram for explaining one example of a method for combining the triangle wave and the sine wave. When the frequency of the triangle wave illustrated in FIG. 3(A) is defined as f and the amplitude thereof is defined as A, and also the frequency of the sine wave illustrated in FIG. 3(B) is defined as nf (where n is an integer of, for example, 10 or more) and the amplitude thereof is defined as A', then the sine wave amplitude A' is 1 (nfπ). The slope of the rising portion TRup of the triangle wave is 1, and the slope of the falling portion TRdown is −1. As is illustrated in FIG. 3(A), at the point wherein the distance of the rising portion TRup and the falling portion TRdown of the triangle wave is ½ nf), replacing the maximum portion TRmax and the minimum portion TRmin of the triangle wave with the respective maximum portion SImax and minimum portion SImin of a sine wave makes it possible to connect the triangle wave and the sine wave smoothly, making it possible to obtain a waveform such as in FIG. 3 (C).

Note that in the example illustrated in FIG. 3, the sine wave maximum portion SImax is a half period portion on the maximum value side, and the minimum portion SImin is a half period portion on the minimum value side. In FIG. 3(D), which is a magnification of a portion of FIG. 3(C), if the height of the maximum portion of the sine wave is 1, then the width is 2π.

Figure 3A:
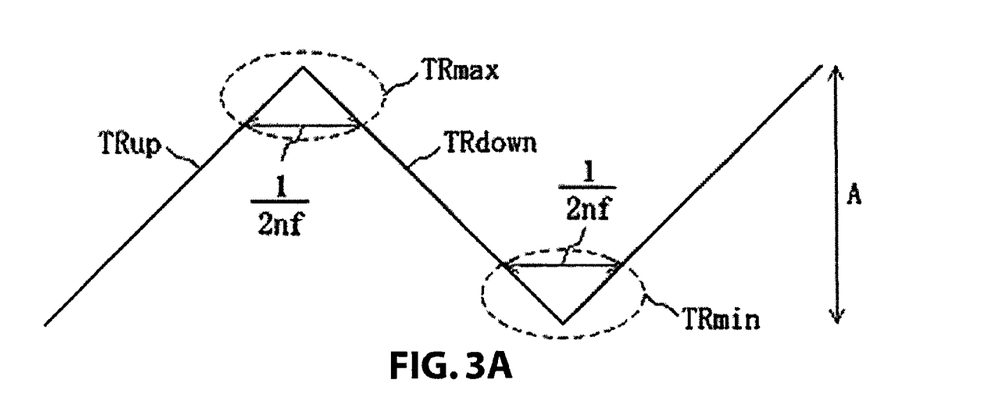
FIGS. 3(A), (B), (C), and (D) are diagrams for explaining an example of a method for combining a triangle wave and a sine wave.
Figure 3B:
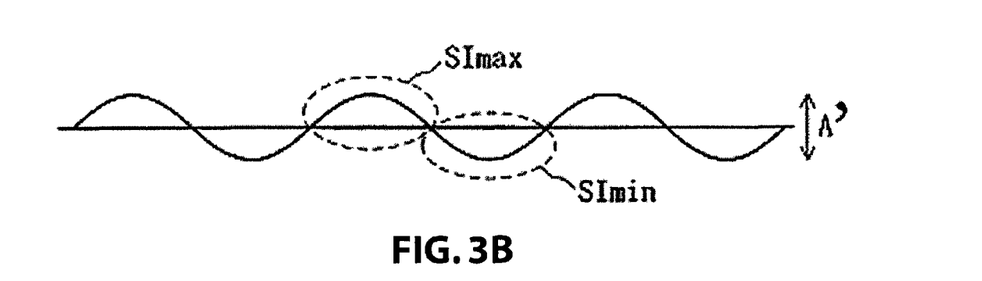
Figure 3C:
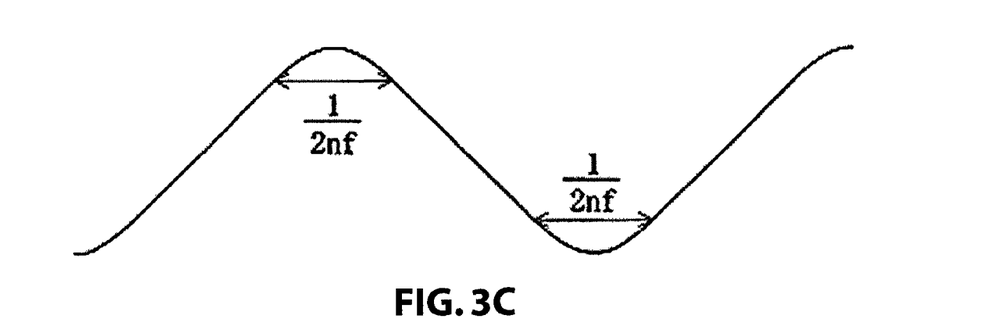
Figure 3D:
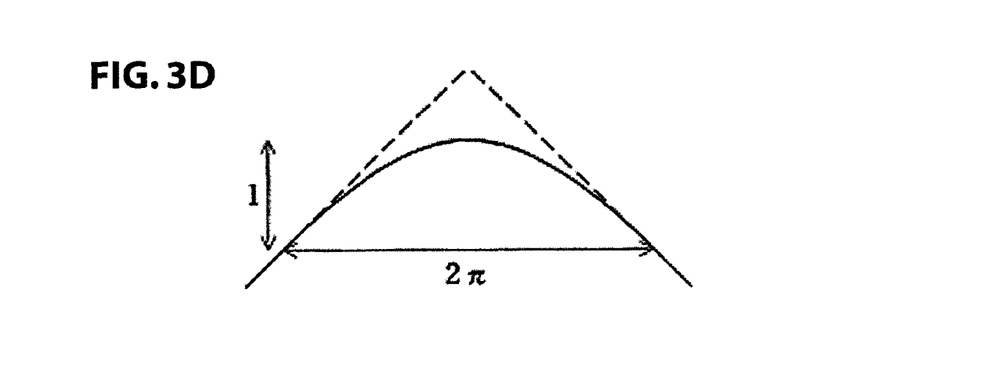

In generating the driving electric current of the synthesized waveform as in FIG. 3 (C), a digital value for the driving electric current of a waveform such as in FIG. 3(C) may be set in advance in a memory (not shown) in the laser driver 4, and this digital value may be converted into an analog signal by a D/A converter (not shown), and outputted to the laser driver 4.

The laser beam that is emitted from the semiconductor laser 1 is focused by the lens 3 and directed at the measurement object 10. The beam of the semiconductor laser 1 that is reflected on the measurement object 10 is focused by the lens 3 and injected into the semiconductor laser 1. The photodiode 2 is disposed within the semiconductor laser 1, or in the vicinity thereof, and converts the optical power of the semiconductor laser 1 into an electric current. The current-voltage converting amplifier 5 converts the output current of the photodiode 2 into a voltage, which it then amplifies.

Figure 4A:
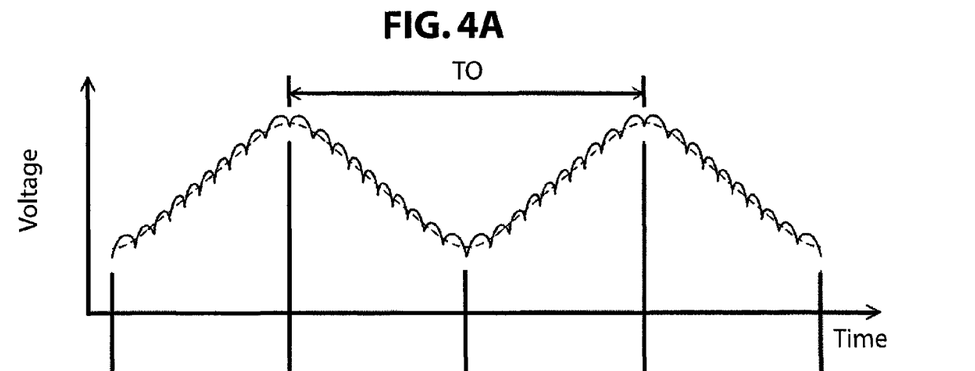
FIGS. 4(A) and (B) are diagrams illustrating schematically an output voltage waveform from a current-voltage converting amplifier and an output voltage waveform from a filter circuit in an embodiment according to the present invention.
Figure 4B:
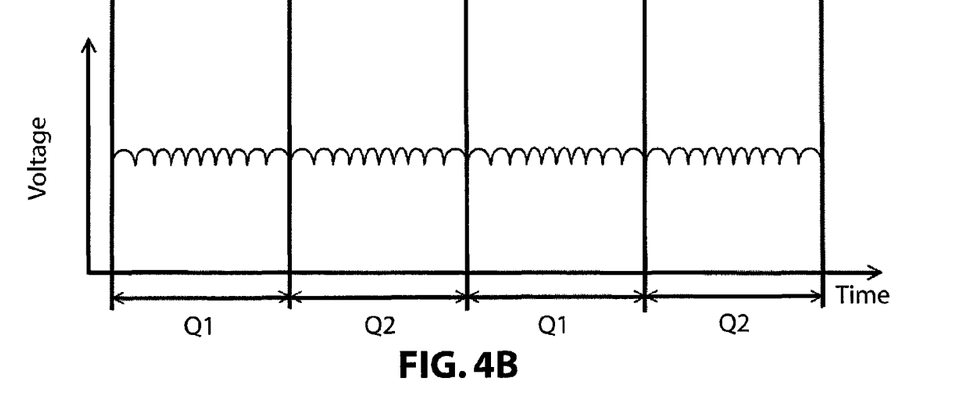

The filter circuit 6 has a function for extracting a superimposed signal from the modulated wave. FIG. 4(A) is a diagram that illustrates schematically the output voltage waveform from the current-voltage converting amplifier 5, and FIG. 4(B) is a diagram illustrating schematically the output voltage; waveform from the filter circuit 6. These figures illustrate the process of extracting the MHP waveform (the interference waveform) of FIG. 4(B) by eliminating the emission waveform (the carrier wave) from the semiconductor laser 1 in FIG. 2 from the waveform in FIG. 4(A) (the modulated wave) that corresponds to the output of the photodiode 2.

The counting device 7 counts the number of MHPs included in the output of the filter circuit 6 for the first counting period Q1 and the second counting period Q2. The counting device 7 may use a counter made from a logical gate, or may count the MHP frequency (that is, the number of MHPs per unit time) using FFT (Fast Fourier Transform).

In the example of FIG. 4(A) and FIG. 4(B), the length of the first counting period Q1 of the output voltage of the current-voltage converting amplifier 5, and the length of the second counting period Q2 on the falling side of the output voltage are each set to one half period of the emission waveform, or in other words, set to T0/2; however, there is no limitation thereto. The first counting period Q1 and the second counting period Q2 preferably are set so as to exclude the timing of the maximum values and minimum values of the output voltage. In this case, the length of the first counting period Q1 and the length of the second counting period Q2 will both be shorter than T0/2.

Figure 5:
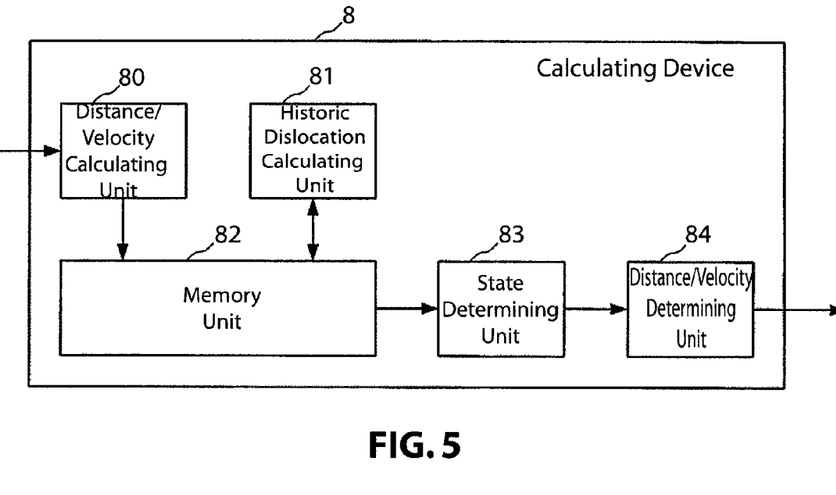
FIG. 5 is a block diagram illustrating one example of a structure of a calculating device in an embodiment according to the present invention.
Figure 6:
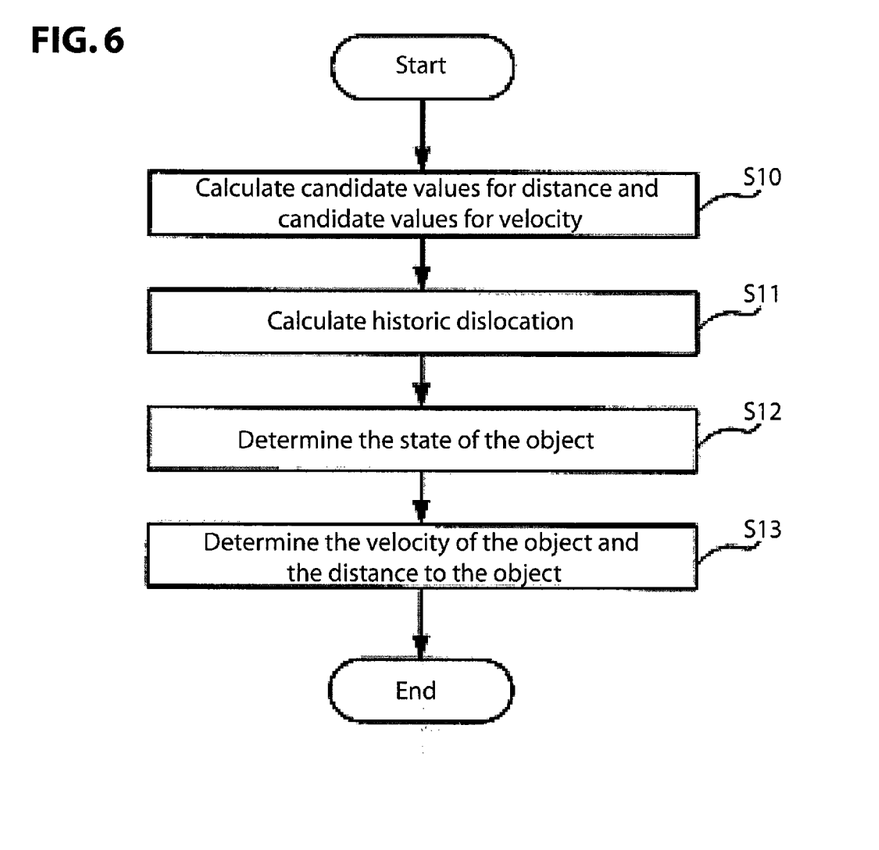
FIG. 6 is a flowchart illustrating the operation of the calculating device in an embodiment according to the present invention.

Next, the calculating device 8 calculates the distance to the measurement object 10 and the velocity of the measurement object 10 based on the number of MHPs counted by the counting device 7, the minimum emission wavelength λa and the maximum emission wavelength λb of the semiconductor laser 1. FIG. 5 is a block diagram of one example of a structure of the calculating device 8, and FIG. 6 is a flowchart illustrating the operation of the calculating device 8. The calculating device 8 includes a distance/velocity calculating unit 80 for calculating candidate values for the distance to the measurement object 10 and candidate values for the velocity of the measurement object 10 based on the number of MHPs and on the minimum emission wavelength λa and the maximum emission wavelength λb of the semiconductor laser 1; a historic dislocation calculating unit 81 for calculating the historic dislocation that is the difference between the candidate value for the distance, calculated by the distance/velocity calculating unit 80, and the candidate value for the distance calculated last time; a memory unit 82 wherein is stored the results of the calculation of the distance/velocity calculating unit 80 and the historic dislocation calculating unit 81; a state determining unit 83 for determining the state of the measurement object 10 based on the results of the calculations by the distance/velocity calculating unit 80 and the historic dislocation calculating unit 81; and a distance/velocity determining unit 84 for determining the distance to the measurement object 10 and the velocity of the measurement object 10 based on the determination results of the state determining unit 83.

In this embodiment, it is a given that the state is either an infinitesimally dislocated state wherein the state of the measurement object 10 fulfills specific conditions, or a dislocated state wherein there is more movement than an infinitesimally dislocated state. When the average dislocation of the measurement object 10 per one half period of the emission waveform from the semiconductor laser 1 is defined as V, then an infinitesimally dislocated state is a state wherein $(\lambda b - \lambda a)/\lambda b > V/Lb$ is fulfilled (where Lb is the distance at time t), and the "dislocated state" is the state wherein $(\lambda b - \lambda a)/\lambda b \leq V/Lb$ is fulfilled.

Firstly, the distance/velocity calculating unit 80 of the calculating device 8 calculates the candidate values $L\alpha(t)$, $L\beta(t)$ for the distance at the current time t and the candidate values $V\alpha(t)$ and $V\beta(t)$ for the velocity using the following equations, and stores the results in the memory unit 82 (Step S10 in FIG. 6):

$$L\alpha(t) = \lambda a \times \lambda b \times (MHP(t-1) + MHP(t))/\{4 \times \lambda b - \lambda a)\} \quad (2)$$

$$L\beta(t) = \lambda a \times \lambda b \times (|(MHP(t-1) - MHP(t))|)/\{4 \times \lambda b - \lambda a)\} \quad (3)$$

$$V\alpha(t) = ((MHP(t-1) - MHP(t)) \times \lambda b/4 \quad (4)$$

$$V\beta(t) = ((MHP(t-1) + MHP(t)) \times \lambda b/4 \quad (5)$$

In Equation (2) through Equation (5), MHP(t) indicates the number of MHPs calculated at the current time t, and MHP (t−1) indicates the number of MHPs calculated in the cycle immediately before that of MHP(t). For example, if MHP(t) is the result of the counting over the first counting period Q1, then MHP(t−1) is the result of over the second counting period Q2, and conversely, if MHP(t) is the result of counting over the second counting period Q2, then MHP(t−1) is the result of counting over the first counting period Q1.

The candidate values $L\alpha(t)$ and $V\alpha(t)$ are values calculated assuming that the measurement object 10 is in an infinitesimally dislocated state, and the candidate values $L\beta(t)$ and $V\beta(t)$ are values calculated assuming that the measurement object 10 is in a dislocated state. The calculating device 8 performs the calculations of Equation (2) through Equation (5) for each time period (each counting period) wherein the number of MHPs is counted by the counting device 7.

Following this, the historic dislocation calculating unit 81 of the calculating device 8 calculates, using the equation below, the historic dislocations that are the differences between the candidate values for the distance at time t and the candidate values for the distance at the immediately previous time, which are stored in the memory unit 82, performed for both an infinitesimally dislocated state and the dislocated state, and stores the results in the memory unit 82 (Step S11 in FIG. 6). Note that in Equation (6) and Equation (7), the candidate values for the distance, calculated at the time immediately previous to the current time t are defined as $L\alpha(t-1)$ and $L\beta(t-1)$:

$$Vcal\alpha(t) = L\alpha(t) - L\alpha(t-1) \quad (6)$$

$$Vcal\beta(t) = L\beta(t) - L\beta(t-1) \quad (7)$$

The historic dislocation $Vcal\alpha(t)$ is the value that is calculated assuming an infinitesimally dislocated state for the measurement object 10, and the historic dislocation $Vcal\beta(t)$ is the value that is calculated assuming a dislocated state for the measurement object 10. The calculating device 8 performs the calculations in Equation (6) and Equation (7) for each time at which the number of MHPs is counted by the counting device 7. Note that in Equation (4) through Equation (7), the approaching direction of the measurement object 10 in the distance/velocity meter of the present form of embodiment defines a positive velocity, and the withdrawing direction defines a negative velocity.

Following this, the state determining unit 83 of the calculating device 8 uses the measurement results from Equation (2) through Equation (7), stored in the memory unit 82, to determine the state of the measurement object 10 (Step S12 in FIG. 6).

As described in JP '080, if the measurement object 10 is moving in an infinitesimally dislocated state (constant velocity motion), then the sign of the historic dislocation $Vcal\alpha(t)$ that was calculated assuming the measurement object 10 to be in a infinitesimally dislocated state will be constant, and the candidate value $V\alpha(t)$ for the velocity, calculated assuming the measurement object 10 to be in an infinitesimally dislocated state will be the same as the average value of the absolute value of the historic dislocation $Vcal\alpha(t)$. Furthermore, if there is constant velocity motion wherein the measurement object 10 is in an infinitesimally dislocated state, then the sign of the historic dislocation $Vcal\beta(t)$ that is calculated assuming that the measurement object 10 is in a dislocated state will invert each time the number of MHPs is counted.

Consequently, the state determining unit 83 determines that the measurement object 10 is in an infinitesimally dislocated state, with constant velocity motion, if the sign of the historic dislocation $Vcal\alpha(t)$ that was calculated assuming an infinitesimally dislocated state of the measurement object 10 remains constant and the candidate value $V\alpha(t)$ that was calculated assuming an infinitesimally dislocated state of the measurement object 10 is equal to the average value of the absolute value of the historic dislocation $Vcal\alpha(t)$.

As described in JP '080, if the measurement object 10 is moving (in constant velocity motion) in the dislocated state, then the sign of the historic dislocation $Vcal\beta(t)$ that is calculated assuming the dislocated state for the measurement object 10 will be constant, and the candidate value $V\beta(t)$ for the velocity, calculated assuming the dislocated state of the measurement object 10, will be equivalent to the average value of the absolute value of the historic dislocation $Vcal\beta(t)$. Additionally, when the measurement object 10 is in the dislocated state and undergoing constant velocity motion, then the sign of the historic dislocation $Vcal\alpha(t)$ that is calculated assuming an infinitesimally dislocated state of the measurement object 10 will invert each time the number of MHPs is counted.

Consequently, the state determining unit 83 will determine that the measurement object 10 is undergoing constant velocity motion in the dislocated state if the sign of the historic dislocation $Vcal\beta(t)$ that is calculated assuming the dislocated state of the measurement object 10 is constant and the candidate value $V\beta(t)$ for the velocity, calculated assuming the dislocated state of the measurement object 10 is equal to the average value of the absolute value of the historic dislocation $Vcal\beta(t)$.

As described in JP '080, when there is motion other than constant motion when the measurement object 10 is in an infinitesimally dislocated state, then the candidate value $V\alpha(t)$ that is calculated assuming the measurement object 10 to be in an infinitesimally dislocated state will not match the average value of the absolute value of the historic dislocation $Vcal\alpha(t)$ that was calculated assuming the measurement object 10 to be into an infinitesimally dislocated state. Similarly, the candidate value $V\beta(t)$ for the velocity, calculated assuming the measurement object 10 to be in the dislocated state will also not match the average value of the absolute value of the historic dislocation $Vcal\beta$ was calculated assuming the measurement object 10 to be in the dislocated state.

Additionally, if there is motion other than constant velocity motion with the measurement object 10 in an infinitesimally dislocated state, the sign of the historic position $Vcal\alpha(t)$ that is calculated assuming the measurement object 10 being in an infinitesimally dislocated state will invert each time the number of MHPs is counted, and even if the sign for the historic dislocation $Vcal\beta(t)$ that is calculated assuming the measurement object 10 to be in the dislocated state varies, this variation will not be with each time the number of MHPs is counted.

Consequently, the state determining unit 83 determines that there is motion other than constant velocity motion, with the measurement object 10 in an infinitesimally dislocated state, when the sign of the historic dislocation $Vcal\alpha(t)$ that is calculated assuming the measurement object 10 to be in an infinitesimally dislocated state inverts each time the number of MHPs is counted and the candidate value $V\alpha(t)$ for the velocity, which is calculated assuming the measurement object 10 to be in an infinitesimally dislocated state, does not match the average value of the absolute value of the historic dislocation $Vcal\alpha(t)$.

Note that, when it comes to the candidate value $V\beta(t)$ of the velocity, the absolute value of $V\beta(t)$ is a constant, and this value is equal to the rate of change of the wavelength of the semiconductor laser 1 $(\lambda b - \lambda a)/\lambda b$. Given this, the state determining unit 83 may instead determined that there is motion other than constant velocity motion, with the measurement object 10 in an infinitesimally dislocated state, when the absolute value of the candidate value $V\beta(t)$ for the velocity, calculated assuming the measurement object 10 to be in the dislocated state is equal to the rate of change of the wavelength and the candidate value $V\alpha(t)$ of the velocity, calculated assuming the measurement object 10 to be in an infinitesimally dislocated state, does not match the average value of the absolute value of the historic dislocation $Vcal\alpha(t)$.

As described in JP '080, if there is motion other than constant velocity motion, when the measurement object 10 is in the dislocated state, the candidate value $V\alpha(t)$ for the velocity, calculated assuming the measurement object 10 to be in an infinitesimally dislocated state, will not match the average value of the absolute value of the historic dislocation $Vcal\alpha(t)$, calculated assuming the measurement object 10 to be in an infinitesimally dislocated state, and the candidate value $V\beta(t)$ for the velocity, calculated assuming the measurement object 10 to be in the dislocated state, will also not match the average value of the absolute value of the historic dislocation $Vcal\beta(t)$, calculated assuming the measurement object 10 to be in the dislocated state.

Additionally, when there is motion other than constant velocity motion, with the measurement object 10 in the dislocated state, the sign of the historic dislocation $Vcal\beta(t)$ that is calculated assuming the measurement object 10 to be in the dislocated state will invert each time the number of MHPs is counted, and even though the sign of the historic dislocation $Vcal\alpha(t)$, calculated assuming the measurement object 10 to be in an infinitesimally dislocated state, will vary, this variation will not be with each time the number of MHPs is counted.

Consequently, the state determining unit 83 will determine that there is motion other than constant velocity motion, with the measurement object 10 in the dislocated state, when the sign of the historic dislocation $Vcal\beta(t)$, calculated assuming the measurement object 10 to be in the dislocated state, inverts each time the number of MHPs is counted, and the candidate value Vβ(t) for the velocity, calculated assuming the measurement object 10 to be in the dislocated state, does not match the average value of the absolute value of the historic dislocation Vcalβ(t).

Furthermore, when it comes to the candidate value Vα(t) for the velocity, the absolute value of Vα(t) is a constant, where this value is equal to the rate of change of the semiconductor laser 1 (λb−λa)/λb. Consequently, the state determining unit 83 may instead determine that there is motion other than constant velocity motion, with the measurement object 10 in the dislocated state, when the absolute value of the candidate value Vα(t) for the velocity, calculated assuming the measurement object 10 to be in an infinitesimally dislocated state, equals the rate of change of the wavelength and the candidate value Vβ(t) of the velocity, calculated assuming the measurement object 10 to be in the dislocated state, does not match the average value of the absolute value of the historic dislocation Vcalβ(t).

The distance/velocity determining unit 84 of the calculating device 8 determines the velocity of the measurement object 10 and the distance to the measurement object 10 based on the determination results of the state determining unit 83 (Step S13 in FIG. 6).

That is, the distance/velocity determining unit 84 determines that the velocity of the measurement object 10 is the candidate value Vα(t) for the velocity, and determines that the distance to the measurement object 10 is the candidate value Lα(t) for the distance when it is determined that there is constant velocity motion with the measurement object 10 in an infinitesimally dislocated state, and determines the velocity of the measurement object 10 to be the candidate value Vβ(t) for the velocity and the distance to the measurement object 10 to be the candidate value Lβ(t) for the distance when it is determined that there is constant velocity motion with the measurement object 10 in the dislocated state.

Additionally, the distance/velocity determining unit 84 determines the velocity of the measurement object 10 to be the candidate value Vα(t) for velocity, and determines the distance to the measurement object 10 to be the candidate value Lα(t) for the distance when it has been determined that there is motion other than constant velocity motion with the measurement object 10 in an infinitesimally dislocated state. However, the actual distance will be the average value for the distance and the candidate value Lα(t). Furthermore, the distance/velocity determining unit 84 determines the velocity of the measurement object 10 to be the candidate value Vβ(t) for velocity and determines the distance to the measurement object 10 to be the candidate value Lβ(t) for distance when it is determined that there is motion other than constant velocity motion, with the measurement object 10 in the dislocated state. Note, the actual distance is the average value of the distance and the candidate value Lβ(t).

Note that, depending on the magnitude relationship between MHP(t−1) and MHP(t), Vβ(t) will always have a positive value and Vα(t) may have either a positive or negative value; however, these signs do not reflect the direction of the velocity of the measurement object 10. When the number of MHPs of the semiconductor laser when the emission wavelength is increasing is greater than the number of MHPs of the semiconductor laser when the emission wavelength is decreasing, then the velocity of the measurement object 10 is in the positive direction (the direction approaching the laser).

The calculating device 8 performs the processes in Step S10 through S13 each time the number of MHPs is counted by the counting device 7 (that is, each for each counting period).

The displaying device 9 displays, in real time, the distance to the measurement object 10 and the velocity of the measurement object, calculated by the calculating device 8.

As described above, in the present embodiment, it is possible to reduce the count error by the counting device 7 because it is possible to dramatically reduce, when compared to the case in FIG. 14(B) the transient waveforms that are produced in the output of the filter circuit 6 with the timing with which the output signal of the current-voltage converting amplifier 5 switches between the rising portion and the falling portion, through providing, to the semiconductor laser 1, a driving electric current of a waveform wherein the maximum portions and the minimum portions of the triangle wave have been rounded. The result is that it is possible to improve the accuracy of the measurement of the distance and velocity relative to the conventional self-coupling laser measurement devices illustrated in FIG. 10 and FIG. 12.

Figure 7:
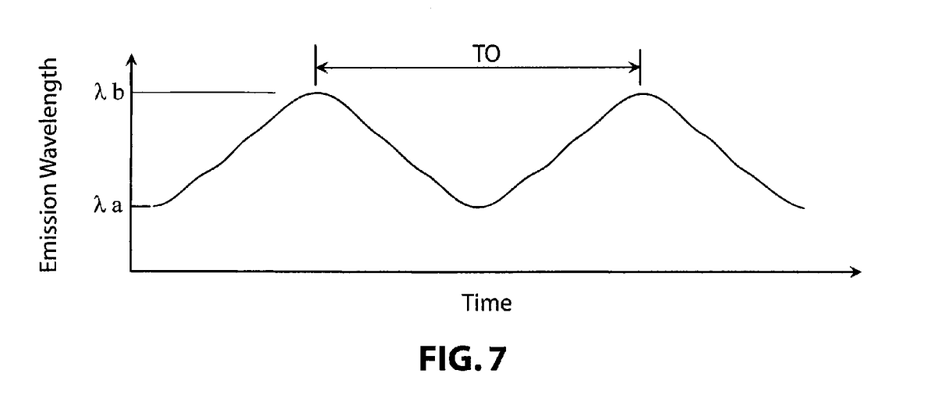
FIG. 7 is a diagram illustrating one example of the changes over time in the emission wavelength of a semiconductor laser in another embodiment according to the present invention.

Although in the above embodiment, a driving electric current of a waveform wherein the maximum portions and minimum portions of a triangle wave were replaced with the maximum portions and minimum portions of a sine wave was provided to the semiconductor laser 1, instead a driving electric current of a synthesized waveform of a plurality of sine waves may be provided to the semiconductor laser 1 in the distance/velocity meter structure of FIG. 1. The changes over time in the emission frequency of the semiconductor laser 1 in this case are shown in FIG. 7.

While in the present form of embodiment, an emission waveform wherein a sine wave of the base frequency f, which is the same as that of the triangle wave, and integer-multiple high-order frequency of sine waves have been a combined was used, an explanation follows regarding how high the order of the frequency must be in the combination.

Figure 8:
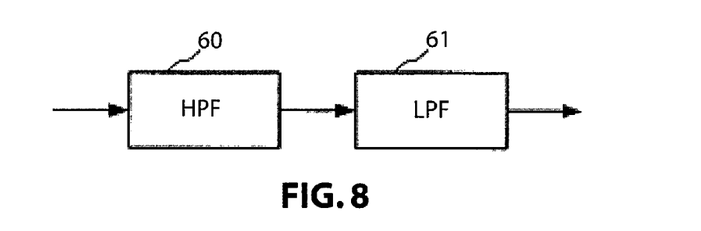
FIG. 8 is a diagram illustrating one example of a structure of a filter circuit in FIG. 1.

FIG. 8 is a diagram illustrating one example of a structure of the filter circuit 6 in FIG. 1. The filter circuit 6 is structured from a high-pass filter 60 for eliminating the carrier wave (the emission waveform from the semiconductor laser 1), and a low-pass filter 61 for eliminating noise.

The base frequency of the emission waveform of the semiconductor laser 1 is defined as f, the minimum frequency of the MHP is defined as fmin, the maximum frequency is defined as fmax, the cutoff frequency for the high-pass filter 60 is defined as fc0, and the cutoff frequency for the low-pass filter 61 is defined as fc1. At this time, the cutoff frequencies for the filters 60 and 61 are set so as to fulfill the following conditions:

$$fc0 < fmin \qquad (8)$$

$$fmax < fc1 \qquad (9)$$

Additionally, when the frequency of the apexes of the triangle wave with the base frequency f is defined as f', then preferably the following conditions are fulfilled:

$$10 \times f = f' < fc0 \qquad (10)$$

In order to adequately reduce the transient waveforms that are produced in the output of the filter circuit 6 while satisfying the conditions in Equation (8) through Equation (10), preferably an emission waveform is used that combines a sine wave of the base frequency f and the higher-order frequencies of the odd orders of at least the third order through the seventh order.

In order to produce a combined waveform driving electric current as in FIG. 7, digital values for the driving electric current of the waveform such as in FIG. 7 may be set in advance in a memory in the laser driver 4, for example, where these digital values are converted into an analog signal by a D/A converter and outputted from the laser driver 4 to the semiconductor laser 1.

The other structures are identical to those in the above embodiment.

Figure 9:
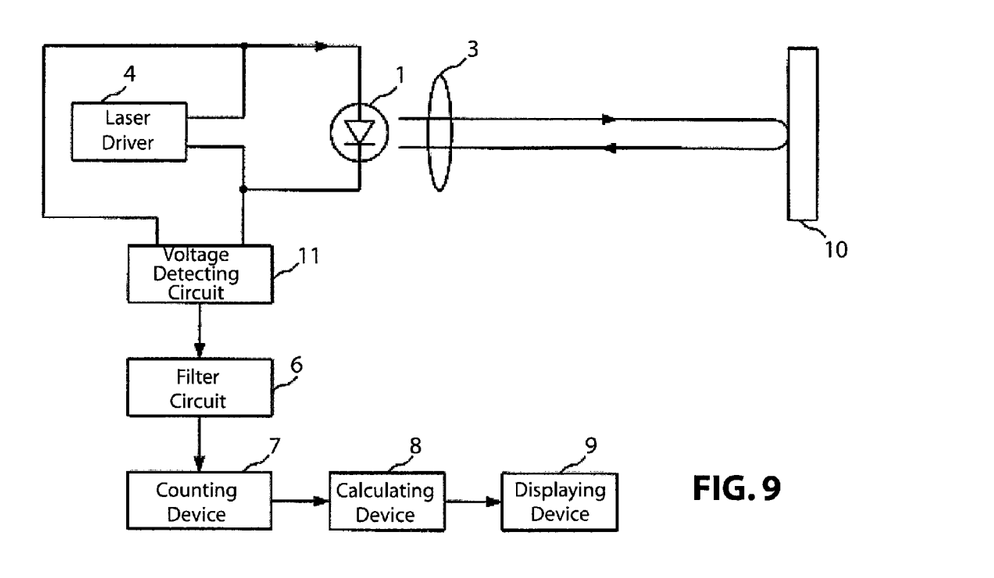
FIG. 9 is a block diagram illustrating the structure of a distance/velocity meter that is a further embodiment according to the present invention.

In the above forms of embodiments, a photodiode 2 and a current-voltage converting amplifier 5 are used as the detecting means for detecting an electric signal including the MHP waveform. Alternatively, the MHP waveform may be extracted without the use of a photodiode. FIG. 9 is a block diagram illustrating the structure of a distance/velocity meter of another embodiment according to the present invention, where those structures that are identical to those in FIG. 1 are given the same codes. In the distance/velocity meter of the present embodiment, a voltage detecting circuit 11 is used as the detecting means instead of the photodiode 2 and the current-voltage converting amplifier 5 of the above embodiment.

The voltage detecting circuit 11 detects and amplifies the voltage between the terminals in the semiconductor laser 1, or in other words, the voltage between the anode and the cathode. When interference occurs between the laser beam that is emitted from the semiconductor laser 1 and the return beam from the measurement object 10, an MHP waveform occurs between the terminals of the semiconductor laser 1. Consequently, it is possible to extract the MHP waveform from between the terminals of the semiconductor laser 1.

The filter circuit 6 has the function of extracting the superimposed signal from the modulated waves, as was the case in the above embodiment, and extracts the MHP waveform from the output voltage of the voltage detecting circuit 11.

The operations of the semiconductor laser 1, the laser driver 4, the counting device 7, the calculating device 8, and the displaying device 9 are identical to those embodiments above.

In this way, the present embodiment makes it possible to extract the MHP waveform without using a photodiode, and thereby possible to reduce the number of components in the distance/velocity meter when compared to the other embodiments, and thus possible to reduce the cost of the distance/velocity meter.

Note that the counting device 7 and the calculating device 8 in the embodiments may be embodied through, for example, a computer that is provided with a CPU, a memory device, and an interface, with a program for controlling these hardware resources. The program for causing such a computer to operate may be provided in a form that is recorded on a recording medium such as a flexible disk, a CD-ROM, a DVD-ROM, a memory card, or the like. The CPU writes, to a memory device, the program that has been read out, and executes the processes, explained in the forms of embodiment, in accordance with the program.

Additionally, though the embodiments used a distance/velocity meter as one example of a physical quantity sensor, the present invention is not limited thereto, but rather may be a distance meter, a velocity meter, or a sensor for measuring other physical quantities.

The present invention can be applied to technologies for measuring a physical quantity up of an object from information regarding interference that occurs due to the self-coupling effect between a laser beam that is emitted from a semiconductor laser and a beam that is returned from the object.

The invention claimed is:

1. A physical quantity sensor comprising:
   a semiconductor laser emitting a laser beam at a measurement object;
   a laser driver supplying to the semiconductor laser a driving electric current with a waveform wherein maximum portions and minimum portions of a triangle wave are rounded;
   a detecting device detecting an electric signal that includes an interference waveform produced by the self-coupling effect of the laser beam emitted from the semiconductor laser and the return beam from the measurement object; and
   a measuring device measuring a physical quantity of the measurement object from interference waveform information that is included in an output signal from the detecting device.

2. The physical quantity sensor as set forth in claim 1, wherein: the waveform of the driving electric current is a waveform wherein maximum portions and minimum portions of the triangle wave are replaced by maximum portions and minimum portions of a sine wave.

3. The physical quantity sensor as set forth in claim 1, wherein: the waveform of the driving electric current is a waveform that combines a sine wave of a fundamental frequency and a sine wave of a higher-order frequency.

4. The physical quantity sensor as set forth in claim 1, wherein: the physical quantity of the measurement object is at least one of a distance from the measurement object and a velocity of the measurement object.

5. The physical quantity sensor as set forth in claim 4, wherein the measuring device comprises:
   a counting device counting the number of interference waveforms included in an output signal of the detecting device over a counting period on a rising side of the semiconductor laser emission wavelength and over a counting period on a falling side of the emission wavelength; and
   a calculating device calculating at least one of a distance from the measurement object and a velocity of the measurement object from the counting results of the counting device and the minimum emission wavelength and the maximum emission wavelength of the semiconductor laser.

6. A physical quantity measuring method wherein a semiconductor laser is used to emit a laser beam onto a measurement object, comprising the steps of:
   supplying a driving electric current having a waveform wherein maximum portions and minimum portions of a triangle wave are rounded to a semiconductor laser to operate the semiconductor laser;
   detecting an electric signal that includes an interference waveform that is produced by the self-coupling effect between a laser beam emitted from the semiconductor laser and a return beam from the measurement object; and
   measuring a physical quantity of the measurement object from interference waveform information that is included in the output signal obtained in the detecting process.

7. The physical quantity measuring method as set forth in claim 6, further comprising the step of replacing the maximum portions and minimum portions of the triangle wave of the waveform of the driving electric current with maximum portions and minimum portions of a sine wave.

8. The physical quantity measuring method as set forth in claim 6, further comprising the step of combining a sine wave of a fundamental frequency and a sine wave of a higher-order frequency to form the waveform of the driving electric current.

9. The physical quantity measuring method as set forth in claim 6, wherein: the physical quantity of the measurement object is at least one of a distance from the measurement object and a velocity of the measurement object.

10. The physical quantity measuring method as set forth in claim 9, wherein the measuring step comprises the steps of:
counting the number of interference waveforms included in an output signal of the detecting device over a counting period on the rising side of the semiconductor laser emission wavelength and over a counting period on the falling side of the emission wavelength; and calculating a distance from at least one of the measurement object and a velocity of the measurement object from the counting results of the counting means and the minimum emission wavelength and the maximum emission wavelength of the semiconductor laser.

* * * * *